(12) United States Patent
Liao et al.

(10) Patent No.: US 8,873,489 B2
(45) Date of Patent: Oct. 28, 2014

(54) SIGNALING METHODS FOR UE-SPECIFIC DYNAMIC DOWNLINK SCHEDULER IN OFDMA SYSTEMS

(75) Inventors: Pei-Kai Liao, Nantou County (TW); Chih-Yuan Lin, Yilan County (TW); Yih-Shen Chen, Hsinchu (TW)

(73) Assignee: Mediatek Inc. (TW)

( * ) Notice: Subject to any disclaimer, the term of this patent is extended or adjusted under 35 U.S.C. 154(b) by 357 days.

(21) Appl. No.: 13/463,113

(22) Filed: May 3, 2012

(65) Prior Publication Data
US 2012/0281646 A1 Nov. 8, 2012

Related U.S. Application Data

(60) Provisional application No. 61/482,822, filed on May 5, 2011.

(51) Int. Cl.
*H04W 4/00* (2009.01)
*H04J 1/00* (2006.01)
*H04W 72/04* (2009.01)
*H04W 28/06* (2009.01)

(52) U.S. Cl.
CPC .......... *H04W 72/042* (2013.01); *H04W 28/06* (2013.01)
USPC .......... 370/329; 370/338; 370/343; 455/69; 455/422.1

(58) Field of Classification Search
USPC .......... 370/310, 328, 329, 338, 343; 455/522, 455/68, 69, 500, 517, 67.11, 504, 507, 514, 455/515, 550.1, 422.1, 403, 426.1, 426.2, 455/445
See application file for complete search history.

(56) References Cited

U.S. PATENT DOCUMENTS

| | | | |
|---|---|---|---|
| 2008/0076438 A1 | 3/2008 | Chang et al. | 455/452.2 |
| 2011/0075624 A1* | 3/2011 | Papasakellariou et al. | 370/329 |
| 2012/0106465 A1* | 5/2012 | Haghighat et al. | 370/329 |
| 2012/0113827 A1* | 5/2012 | Yamada et al. | 370/252 |
| 2012/0281646 A1* | 11/2012 | Liao et al. | 370/329 |

FOREIGN PATENT DOCUMENTS

| | | |
|---|---|---|
| CN | 101909305 A | 6/2009 |
| CN | 101938748 A | 6/2009 |

OTHER PUBLICATIONS

International Search Report and Written Opinion of International Search Authority for PCT/CN2012/075080 dated Aug. 2, 2012 (10 pages).
R1-104607, Samsung, Discussion on PDCCH Capacity Considering MU-MIMO, Aug. 23-27, 2010, Madrid, Spain (6 pages).
R1-104608, Samsung, Compact DCI Design for MU-MIMO, Aug. 23-27, 2010, Madrid, Spain (3 pages).
R1-110867, NTT DOCOMO, CoMP with Lower Tx Power RRH in Heterogeneous New work, Feb. 21-25, 2011, Taipei, Taiwan (8 pages).

* cited by examiner

*Primary Examiner* — Benjamin H Elliott, IV
(74) *Attorney, Agent, or Firm* — Zheng Jin

(57) ABSTRACT

Signaling methods for UE-specific downlink control channels in OFDMA systems are provided. In a first method, a dynamic downlink signaling in cell-specific radio resources is used to signal UE-specific downlink control channel in UE-specific radio resources. In LTE, a specific DCI format in PDCCH is used to dynamically signal the UE-specific downlink control channel X-PDCCH that resides in legacy PDSCH region. In a second method, a semi-static higher-layer signaling is used to signal UE-specific downlink control channel in UE-specific radio resources. In LTE, RRC signaling is used to semi-statically signal the UE-specific downlink control channel X-PDCCH that resides in legacy PDSCH region. By using UE-specific downlink control channels, significant control overhead reduction can be achieved.

20 Claims, 7 Drawing Sheets

SIGNALING METHODS FOR UE-SPECIFIC DYNAMIC DOWNLINK SCHEDULER IN OFDMA SYSTEMS

CROSS REFERENCE TO RELATED APPLICATIONS

This application claims priority under 35 U.S.C. §119 from U.S. Provisional Application No. 61/482,822, entitled "Signaling Methods for UE-Specific Dynamic Downlink Scheduler in OFDMA systems," filed on May 5, 2011, the subject matter of which is incorporated herein by reference.

TECHNICAL FIELD

The disclosed embodiments relate generally to downlink scheduling, and, more particularly, to signaling methods for UE-Specific downlink control channel in OFDMA systems.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for downlink scheduling. In the current LTE specification, PDCCH can be configured to occupy the first one, two, or three OFDM symbols in a subframe.

One promising technology for LTE is the use of Multiple Input Multiple Output (MIMO) antennas that can further improve the spectral efficiency gain by using spatial division multiplexing. Multiple antennas allow for an additional degree of freedom to the channel scheduler. Multi-user MIMO (MU-MIMO) is considered in LTE Rel-10. As compared to Single-user MIMO (SU-MIMO), MU-MIMO offers greater spatial-domain flexibility by allowing different users to be scheduled on different spatial streams over the same RB. By scheduling the same time-frequency resource to multiple UEs, more UEs will be scheduled in the same subframe to take advantage of spatial multiplexing. To enable MU-MIMO, individual control signaling must be indicated to each UE via PDCCH. As a result, more PDCCH transmissions are expected, as the number of scheduled UEs per subframe will increase. However, the maximum 3-symbol PDCCH region may not be enough to accommodate the increased number of UEs in LTE. Due to limited control channel capacity, the MIMO performance degrades because of non-optimized MU-MIMO scheduling.

In LTE Rel-11, various deployment scenarios for coordinated multi-point (CoMP) transmission/reception are introduced. Among the different CoMP scenarios, CoMP scenario 4 refers to Single Cell ID CoMP in heterogeneous network with low-power remote radio heads (RRH). In CoMP scenario 4, low-power RRHs are deployed within the macrocell coverage provided by macro-eNB. The RRHs have the same cell IDs as the macrocell. In such single cell ID CoMP operation, PDCCH must be transmitted from all transmission points and then soft combined without cell-splitting gain. Because the physical signal generation of PDCCH is linked to cell ID, UEs served by different points can only share the same physical resource for PDCCH if the same cell ID is shared among the different points. This creates a control channel capacity problem similar to the MU-MIMO situation illustrated above.

To address the control channel capacity problem, an UE-specific downlink scheduler for MU-MIMO/CoMP has been proposed. In LTE, it extends the PDCCH design to a new X-PDCCH, which is in the legacy Physical Downlink Shared Channel (PDSCH). How to signal UEs about the scheduling information of X-PDCCH, however, is unclear. For example, if the signaling is provided by PDCCH for each UE, then the same control channel capacity problem occurs. On the other hand, if the signaling is configured by higher-layer, then control overhead of X-PDCCH cannot be adjusted dynamically. A solution is sought.

SUMMARY

Signaling methods for UE-specific downlink control channels in OFDMA systems are provided. Dynamic or semi-static signaling is used to signal information for UE-specific downlink control channels. By using UE-specific downlink control channels, significant control overhead reduction can be achieved.

In a first method, a dynamic downlink signaling in cell-specific radio resources is used to signal UE-specific downlink control channel in UE-specific radio resources. In LTE, a specific DCI format in PDCCH is used to dynamically signal the UE-specific downlink control channel X-PDCCH that resides in legacy PDSCH region. The content of the dynamic signaling at least consists of the following information partially or fully: a group ID, a resource allocation type, resource block assignment for the UE-specific downlink control channel, and a MIMO rank and antenna port(s) used for the decoding of UE-specific downlink control channel. The group ID is used for UEs to determine which UE group they belong to and identify which dynamic signaling they should reference to find their UE-specific downlink control channel.

In a second method, a semi-static higher-layer signaling is used to signal UE-specific downlink control channel in UE-specific radio resources. In LTE, RRC signaling is used to semi-statically signal the UE-specific downlink control channel X-PDCCH that resides in legacy PDSCH region. The content of the semi-static signaling information at least consists of the following information partially or fully: enablers of UE-specific downlink control channel, a resource allocation type, resource block assignment for the UE-specific downlink control channel, and MIMO rank and antenna port(s) used for the decoding of UE-specific downlink control channel.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
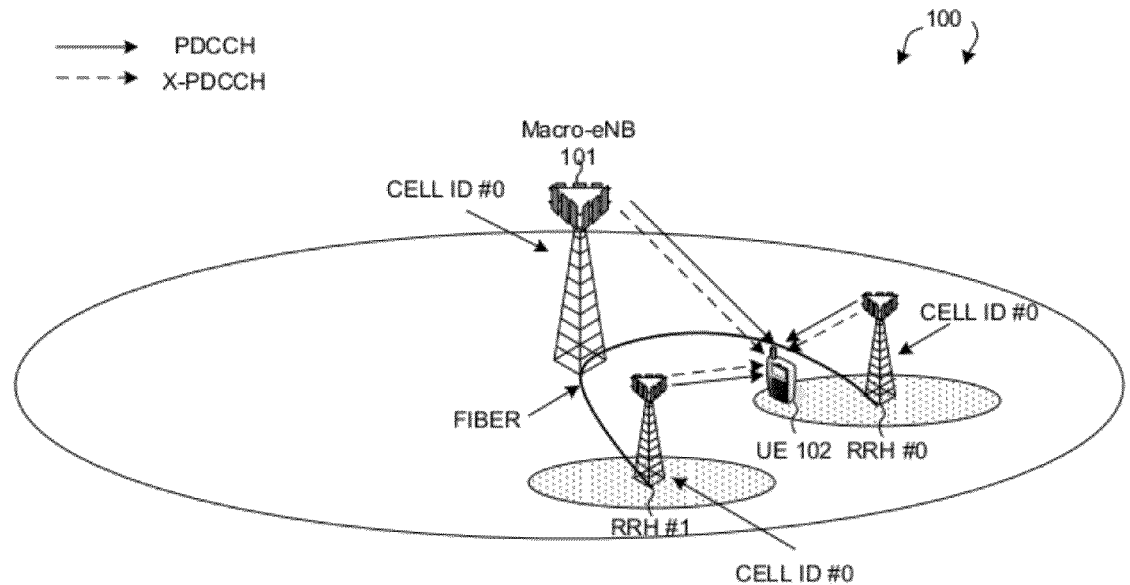
FIG. 1 illustrates a wireless communication network with UE-specific downlink scheduling in accordance with one novel aspect.

FIG. 1 illustrates a wireless communication network 100 with UE-specific downlink scheduling in accordance with one novel aspect. Wireless communication network 100 comprises a macro-eNB 101, a first remote radio head RRH#0, a second RRH#1, and a user equipment UE 102. FIG. 1 illustrates a coordinated multi-point (CoMP) deployment scenario 4 in LTE Rel-11 networks. In CoMP deployment scenario 4, the low-power RRHs are located within the macrocell coverage provided by macro-eNB 101, where the transmission and reception points created by RRH#0 and RRH#1 have the same cell ID as the macrocell (e.g., CELL ID#0). In such single cell ID CoMP operation, a control channel must be transmitted from all transmission points and then soft combined without cell-splitting gain. Because the physical signal generation of a control channel is linked to cell ID, UEs served by different points can only share the same physical resources for the control channel if the same cell ID is shared among the different points. This creates a control channel capacity problem similar to the MU-MIMO situation. To enable MU-MIMO, individual control signaling must be indicated to each UE via control channel. As a result, more control channel transmissions are expected, as the number of scheduled UEs per subframe will increase.

In LTE networks, Physical Downlink Control Channel (PDCCH) is used for legacy downlink scheduling. In the example of FIG. 1, macro-eNB 101, RRH #0, and RRH #1, all transmit downlink-scheduling signals to UE 102 via PDCCH sharing the same cell-specific radio resources. In one novel aspect, to increase control channel capacity, a new UE-specific downlink control channel using UE-specific radio resources is introduced, especially for MU-MIMO and CoMP deployment scenario 4. The new UE-specific downlink control channel is an enhanced PDCCH (ePDCCH), which resides in legacy Physical Downlink Shared Channel (PDSCH), and multiplexes with R12 PDSCH by FDM. The UE-specific control channel applies demodulation reference signal (DM-RS) and allows MIMO precoding. The UE-specific control channel achieves spatial reuse of the PDSCH, which is transmitted only from the associated transmission point(s) for each UE.

Figure 2:
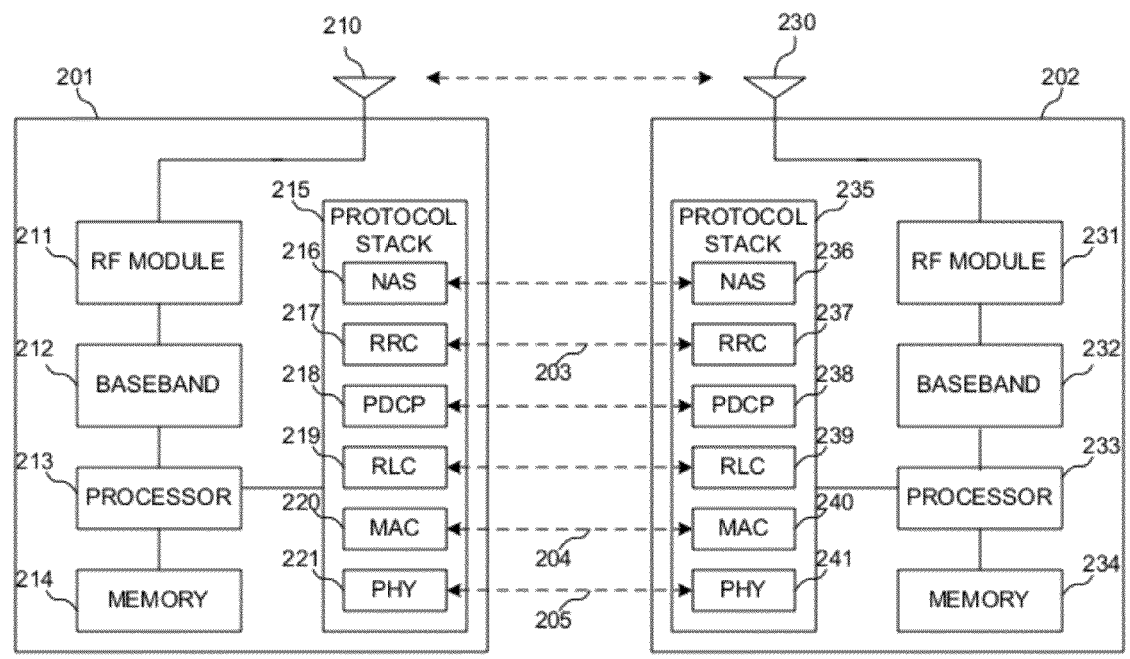
FIG. 2 is a simplified block diagram of a UE and an eNB in accordance with one novel aspect.

FIG. 2 illustrates simplified block diagrams of an exemplary wireless communication terminal UE 201 and base station eNB 202. UE 201 and eNB 202 may operate following any communication protocol. For illustrative purposes, the disclosed embodiment operates according to the LTE protocol. UE 201 comprises a transceiver antenna 210 coupled to RF Module 211. Transceiver antenna 210 receives or transmits RF signals. Although only one antenna is shown for UE 201, it is known to the skilled in the art that wireless terminals may have multiple antennas for transmission and reception. RF Module 211 receives signals from either transceiver antenna 210 or baseband module 212, and converts the received signals to baseband frequency. The baseband module 212 processes the signals transmitted from or received by UE 201. Such processing includes, for example, modulation/demodulation, channel coding/decoding, and source coding/decoding. UE 201 further comprises processor 213 that processes digital signals and provides other control functionalities. Memory 214 stores program instructions and data to control the operations of UE 201. Similarly, eNB 202 comprises a transceiver antenna 230 coupled to RF module 231, a baseband module 232, a processor 233, and memory 234.

UE 201 and eNB 202 communicate with each other via a commonly defined layered protocol stack 215. The layered protocol stack 215 includes Non Access Stratum (NAS) layer 216, which is the protocol between an UE and a mobility management entity (MME) to provide upper layer network control, Radio Resource Control (RRC) layer 217, Packet Data Convergence Control (PDCP) layer 218, Radio Link Control (RLC) layer 219, Media Access Control (MAC) layer 220, and Physical Layer (PHY) 221. The different modules and protocol layer modules may be function modules or logical entities, and may be implemented by software, firmware, hardware, or any combination thereof. The different modules work together, when executed by the processor, allow UE 201 and eNB 202 to perform various communication activities.

In particular, LTE systems use physical layer to provide legacy dynamic downlink schedulers and uplink grants via cell-specific PDCCH. In addition to the legacy cell-specific PDCCH, part of legacy data channel is reserved for UE-specific downlink control channel as an enhanced PDCCH. In LTE, the UE-specific downlink schedulers and uplink grants are contained in a UE-specific downlink control channel, which is a UE-specific PDCCH that resides in legacy PDSCH region. For convenience, the UE-specific PDCCH is referred to as X-PDCCH in the present invention. Two signaling methods are proposed to provide signaling information for the UE-specific downlink control channel X-PDCCH. In one embodiment, dynamic signaling via PHY layer is used for the UE-specific downlink control channel X-PDCCH. In LTE, PDCCH is used to multi-cast a group of UEs the information of the UE-specific downlink control channel. In another embodiment, semi-static signaling via RRC layer is used for the UE-specific downlink control channel X-PDCCH. In LTE, RRC signaling is used to multi-cast a group of UEs the information of the UE-specific downlink control channel. The radio resources of the UE-specific downlink control channel can be shared by multiple groups of UEs.

Figure 3:
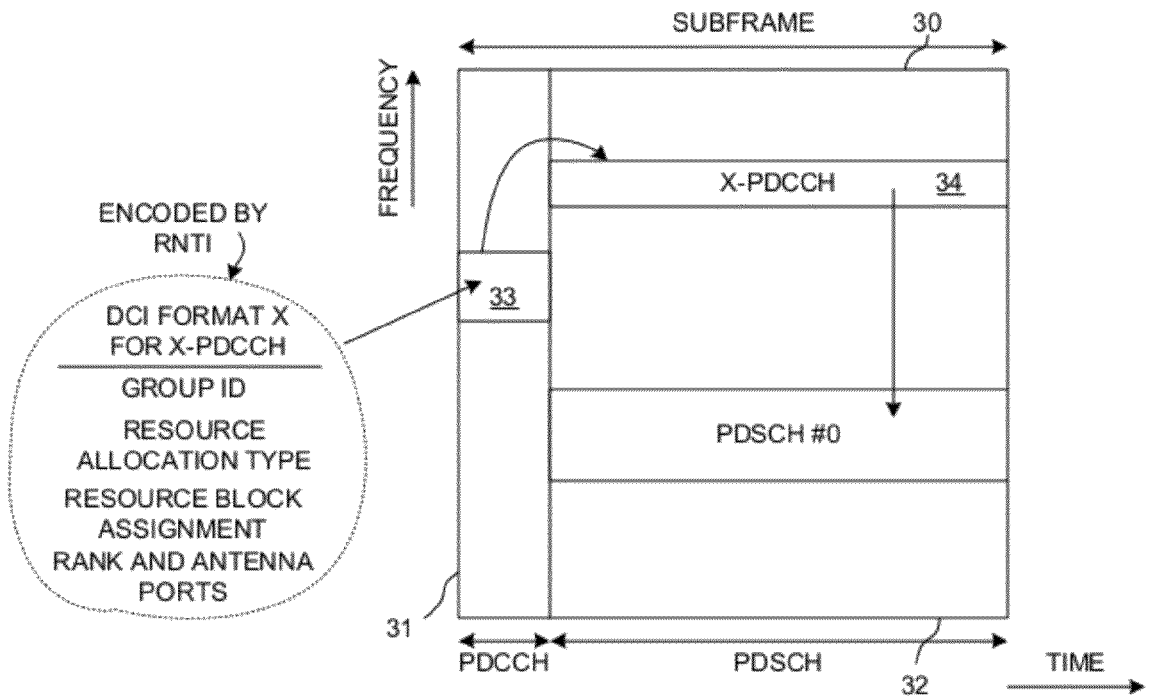
FIG. 3 illustrates one example of dynamic signaling for UE-specific downlink control channel.

FIG. 3 illustrates one example of dynamic signaling for UE-specific downlink control channel X-PDCCH. A dynamic downlink signaling in cell-specific radio resources is used to signal UEs the information of UE-specific downlink control channel in UE-specific radio resources. In general, cell-specific radio resource is a kind of physical channel using common pilots without MIMO precoding. On the other hand, UE-specific radio resource is a kind of physical channel using dedicated pilots, which can be MIMO precoded. A higher-layer signaling is used to configure UEs whether to utilize the UE-specific downlink control channel X-PDCCH or not. The configured UEs decode the downlink schedulers and/or uplink grants in UE-specific downlink control channel based on the dynamic downlink signaling information, and obtains the assignment information for downlink data packet and/or uplink transmission opportunity. By using dynamic downlink signaling, the control overhead of UE-specific X-PDCCH can be adjusted subframe-by-subframe because the needs from UEs may vary fast in each subframe.

In LTE, a new DCI format in PDCCH is used to dynamically signal UEs the information of UE-specific X-PDCCH. For convenience, the new DCI format is called "DCI format X" in the present invention. DCI format X can be one of legacy DCI formats, or a modified version based on one of legacy DCI formats. An RRC signaling is used to configure UEs whether to utilize X-PDCCH or not. If a UE is configured to do so, then the UE decodes its own downlink schedulers and/or uplink grants in X-PDCCH based on the information obtained from the decoding of the DCI format X in PDCCH. After decoding the schedulers and/or uplink grants in X-PDCCH, the UE can proceed to decode the corresponding downlink data packet and/or uplink transmission opportunity.

In the example of FIG. 3, PDCCH 31 occupies first few OFDM symbols in subframe 30, while PDSCH 32 occupies the rest of the OFDM symbols in subframe 30. A DCI format X 33 in PDCCH 31 is used to dynamically signal UEs the information of the UE-specific X-PDCCH 34, which resides in PDSCH 32. The content of the DCI format X at least consists of the following information partially or fully: a group ID, resource allocation type, resource block assignment for the UE-specific downlink control channel, MIMO rank and antenna port(s) used for the decoding of UE-specific downlink control channel. The group ID is used for UEs to determine which UE group they belong to and identify which DCI format X they should reference to find their UE-specific downlink control channel. The group ID is configured by higher layers. The downlink schedulers and uplink grants in the same group are in the same MIMO layer for UE-specific downlink control channel. For example, if two layers are used for UE-specific downlink control channel, then two group IDs are used to differentiate two DCI format X for different groups of UEs. The design of group ID can be used to reduce possible consumption of control information signature. In addition, the group of UEs can use a single antenna port, or use multiple antenna ports for the decoding of downlink schedulers and/or uplink grants in the UE-specific downlink control channel, as specified by the dynamic downlink signaling via DCI format X 33.

A specific signature is applied to encode the dynamic downlink signaling so that UEs can identify the purpose of this dynamic signaling and avoid possible decoding actions if they are not configured by higher layers. UEs not configured to use the UE-specific downlink control channel can skip the decoding of the dynamic signaling. For example, one specific RNTI is used to scramble with the cyclic redundancy check bits of the DCI format X 33. The RNTI can be predefined or configured by RRC signaling. UEs not configured by RRC to use UE-specific X-PDCCH do not have to the decode DCI format X. Upon decoding the DCI format X 33 using the specific RNTI, UEs know the purpose of the signaling is for UE-specific downlink control channel. UEs then can use the obtained information from DCI format X 33 to decode their own schedulers in X-PDCCH 34. For example, UEs may decode assignment information from schedulers in X-PDCCH 34 for data packet contained in PDSCH#0.

In one embodiment, the reserved UE-specific radio resources for UE-specific downlink control channel are viewed as an extended space of legacy downlink control channel. UEs configured to utilize the UE-specific downlink control channel searches for their own downlink schedulers in the legacy PDCCH first and then in UE-specific downlink control channel. The dynamic downlink signaling is a kind of pointer to the UE-specific downlink control channel. Though it may increase the computational burden for the configured UEs, it can support dynamic switching between legacy PDCCH and UE-specific downlink control channel. More specifically, UEs configured to use X-PDCCH searches for their own schedulers in PDCCH first and then in X-PDCCH.

Figure 4:
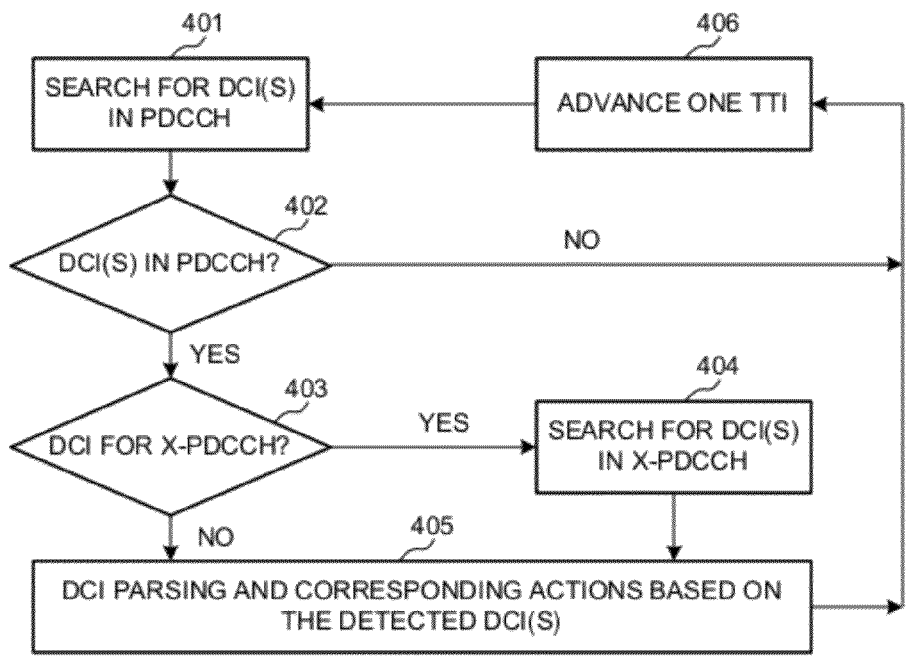
FIG. 4 illustrates a flow chart of one embodiment of a method of dynamic signaling for UE-specific downlink control channel.

FIG. 4 illustrates a flow chart of one embodiment of dynamic signaling for UE-specific downlink control channel X-PDCCH. In step 401, a UE first searches for DCI(s) in PDCCH. If the UE does not find any DCI in step 402, then the UE advances one transmission time interval (TTI) in step 406 and goes back to step 401. Otherwise, the UE searches for DCI format X in PDCCH in step 403, if the UE is configured by RRC to use UE-specific downlink control channel. If the UE found DCI format X, in step 404, the UE then searches for DCI(s) in X-PDCCH based on the signaling information (e.g., radio resource location, group ID, and MIMO related information) contained in DCI format X. In step 405, the UE parses all the DCI(s) and performs corresponding actions based on the DCI(s). Finally, the UE advances one TTI in step 406 and goes back to step 401.

Figure 5:
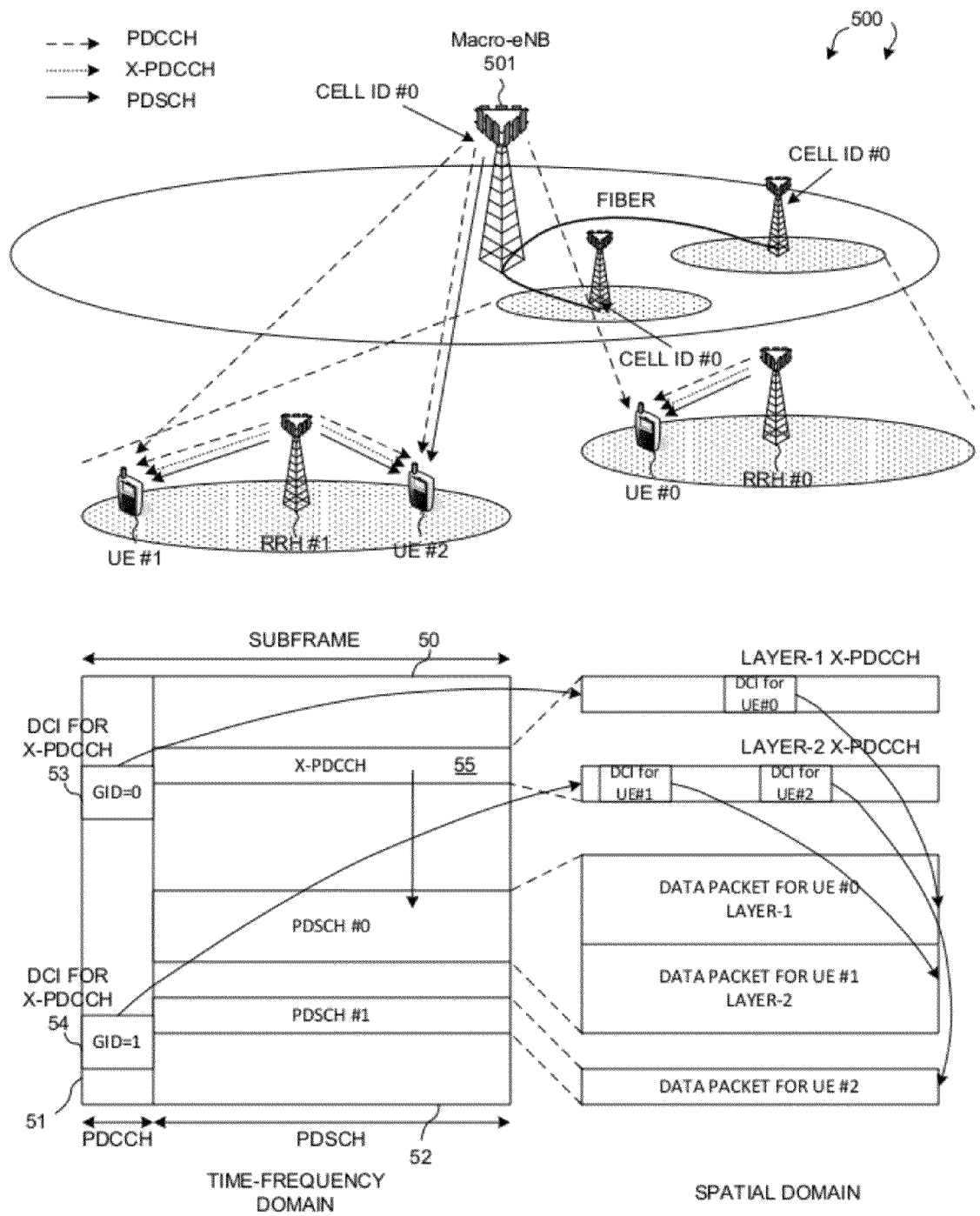
FIG. 5 illustrates one application in CoMP scenario 4 of applying dynamic signaling for UE-specific downlink control channel.

FIG. 5 illustrates one application in CoMP scenario 4 of applying dynamic signaling for UE-specific downlink control channel. Wireless network 500 comprises a macro-eNB 501, a first RRH#0 that serves UE#0, and a second RRH#1 that serves UE#1 and UE#2. All the UEs are configured to use UE-specific downlink control channel. UE#0 is configured with group ID with GID=1, and UE#1 and UE#2 are configured with group ID with GID=0. In the example of FIG. 5, PDCCH 51 occupies first few OFDM symbols in subframe 50, while PDSCH 52 occupies the rest of the OFDM symbols in subframe 50. PDCCH 51 contains two DCI format X, a first DCI format X 53 and a second DCI format X 54. The DCI formats X 53-54 in PDCCH 51 are used to dynamically signal UEs the information of the UE-specific X-PDCCH 55, which resides in PDSCH 52. Because X-PDCCH resides in UE-specific radio resource, spatial domain channel characteristics are used to double the control channel capacity.

For example, X-PDCCH contains two spatial layers for the two groups of UEs. For UE#0 that belongs to GID=0, it decodes signaling information from DCI format X 53, which is associated with the group of GID=0, and contains other signaling information such that UE#0 is able to find layer-1 X-PDCCH. UE#0 then decodes the scheduler (DCI) inside layer-1 X-PDCCH, which contains assignment information for data packet that is located in layer-1 PDSCH#0. Similarly, for UE#1 and UE#2 that belong to GID=1, they decode signaling information from DCI format X 54, which is associated with the group of GID=1, and contains other signaling information such that UE#1 and UE#2 are able to find layer-2 X-PDCCH. UE#1 and UE#2 then decode the schedulers (DCIS) inside layer-2 X-PDCCH, which contain assignment information for data packets that are located in layer-2 PDSCH#0 and PDSCH#1 respectively.

Dynamic signaling for UE-specific downlink control channel provides significant control overhead reduction, as compared to TM9. It dynamically adjusts the control overhead of X-PDCCH and has less RRC signaling overhead. Take channel bandwidth of 50 RBs as an example, and suppose there are N groups of UEs and each group has K UEs. Take the size of DCI format 1D (27 bits) as the size of DCI format X, and DCI format 2C (36 bits) as the size of the scheduler in X-PDCCH. The control overhead of the proposed method is (27*N+ 36*K), and the control overhead of DCI format 2C is (36*N*K). If N=2 and K=4, then the overhead reduction is 31.25%. The overhead reduction ratio increases with the number of UEs in each group and the number of UE groups. In general, the overhead reduction is 1−(27/(36*K)+1/N), where K is the number of UEs in each group and N is the number of UE groups. Therefore, it is especially beneficial for CoMP scenario 4 because the overhead reduction ratio increases when there are more RRHs in a cell and more UEs associated to an RRH.

Figure 6:
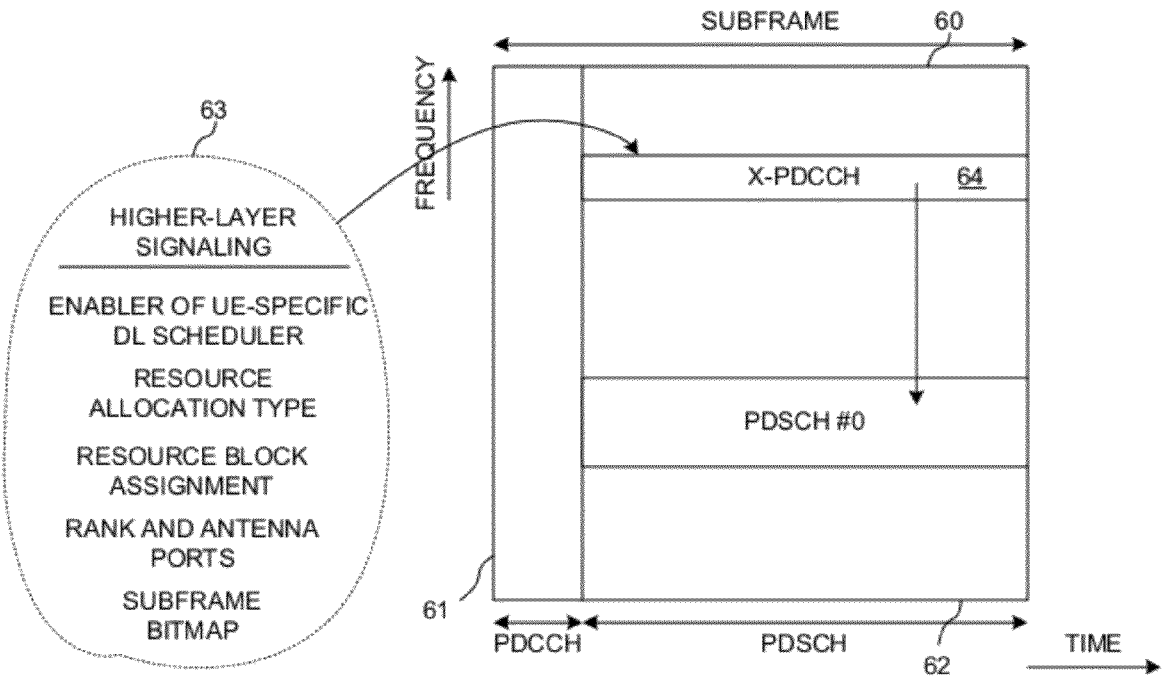
FIG. 6 illustrates one example of semi-static signaling for UE-specific downlink control channel.

FIG. 6 illustrates one example of semi-static signaling for UE-specific downlink control channel. A semi-static higher-layer signaling is used to signal UEs the information of UE-specific downlink control channel in UE-specific radio resource. In general, the higher-layer signaling is a dedicated signaling to each UE. The UE-specific radio resource is a kind of physical channel using dedicated pilots, which can be MIMO precoded. The higher-layer signaling is used to configure UEs whether to utilize UE-specific downlink control channel or not. Based on the semi-static signaling information, the configured UEs decode the downlink schedulers and/or uplink grants in UE-specific downlink control channel to obtain the assignment information for downlink data packet and/or uplink transmission opportunity.

In LTE, RRC signaling is used to signal UEs the information of UE-specific downlink control channel X-PDCCH. For convenience, the RRC signaling is called "RRC signaling X" in the present invention. The RRC signaling X can be either a new RRC signal or a new information element in an existing RRC signal. The RRC signaling X is also used to configure UEs whether to utilize X-PDCCH or not. If a UE is configured to do so, then the UE decodes its own downlink schedulers and/or uplink grants in X-PDCCH based on the semi-static information obtained from the RRC signaling X. After decoding the schedulers and/or uplink grants in X-PDCCH, the UE can proceed to decode the corresponding downlink data packet and/or uplink transmission opportunity.

In the example of FIG. 6, PDCCH 61 occupies first few OFDM symbols in subframe 60, while PDSCH 62 occupies the rest of the OFDM symbols in subframe 60. A higher-layer RRC signaling X 63 is used to signal UEs the information of UE-specific downlink control channel X-PDCCH 64, which resides in PDSCH 62. The content of the semi-static signaling information at least consists of the following information partially or fully: enablers of UE-specific downlink control channel, resource allocation type, resource block assignment for the UE-specific downlink control channel, MIMO rank and antenna port(s) used for the decoding of UE-specific downlink control channel.

In a first embodiment, the reserved UE-specific radio resources for UE-specific downlink control channel are viewed as an extended space of legacy downlink control channel. UEs configured to utilize UE-specific downlink control channel searches for their own schedulers in legacy downlink control channel first and then in UE-specific downlink control channel. More specifically, UEs configured to use X-PDCCH searches for their own schedulers in PDCCH first and then in X-PDCCH.

Figure 7:
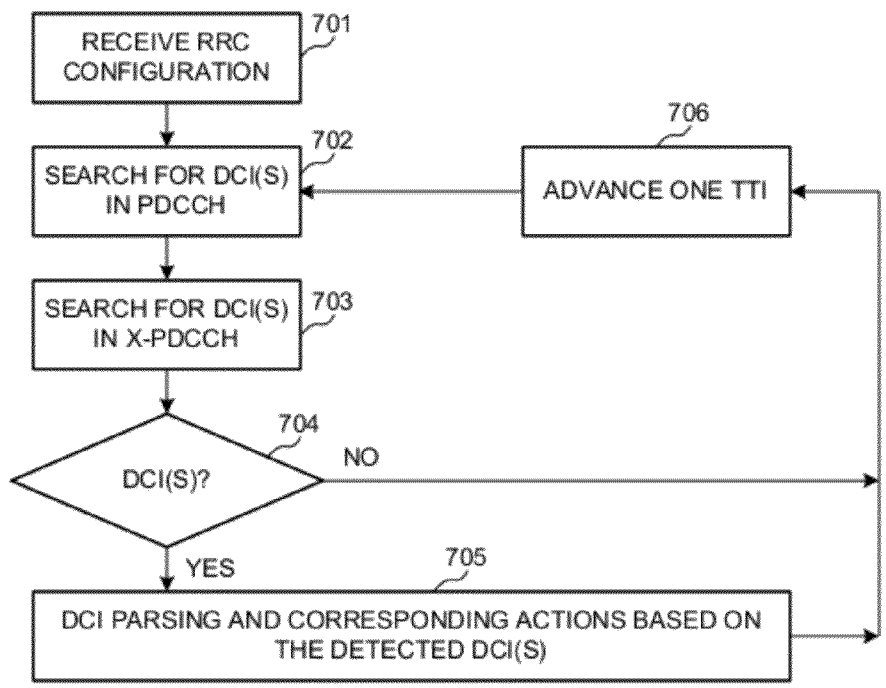
FIG. 7 is a flow chart of a first embodiment of a method of semi-static signaling for UE-specific downlink control channel.

FIG. 7 is a flow chart of the first embodiment of a method of semi-static signaling for UE-specific downlink control channel. In step 701, a UE receives higher-layer RRC signaling X that contains semi-static signaling information for UE-specific downlink control channel. In step 702, the UE searches for DCI(s) in PDCCH. In step 703, the UE searches for DCI(s) in X-PDCCH based on the semi-static signaling information from the RRC signaling X. In step 704, the UE determines whether there is any DCI found in the current TTI. If no DCI is found, then the UE advances one TTI in step 706 and goes back to step 702. On the other hand, the UE parses the DCI(s) and performs corresponding actions based on the DCI(s) in step 705. Finally, the UE advances one TTI in step 706 and goes back to step 702. Note that the UE always searches for DCI(s) in PDCCH before searching in X-PDCCH.

In a second embodiment, subframe information is used to indicate to UEs which subframe contains UE-specific downlink control channel they should monitor. For example, the subframe information may be implemented as a subframe bitmap, and each bit indicates whether a specific subframe contains X-PDCCH and/or X-PDCCH the UEs should monitor. In some cases, there is X-PDCCH in the subframe but some of UEs do not have to monitor X-PDCCH. So the subframe bitmap not only can be used to indicate which subframe contains X-PDCCH, but also can be used to indicate which subframe a UE has to monitor X-PDCCH. The subframe bitmap can be cell-specific or UE-specific, e.g., different among different UEs. In this way, control overhead can also be adjusted in time-domain in addition to frequency domain. In addition, UEs do not have to blindly decode the UE-specific downlink schedulers in every subframe.

Figure 8:
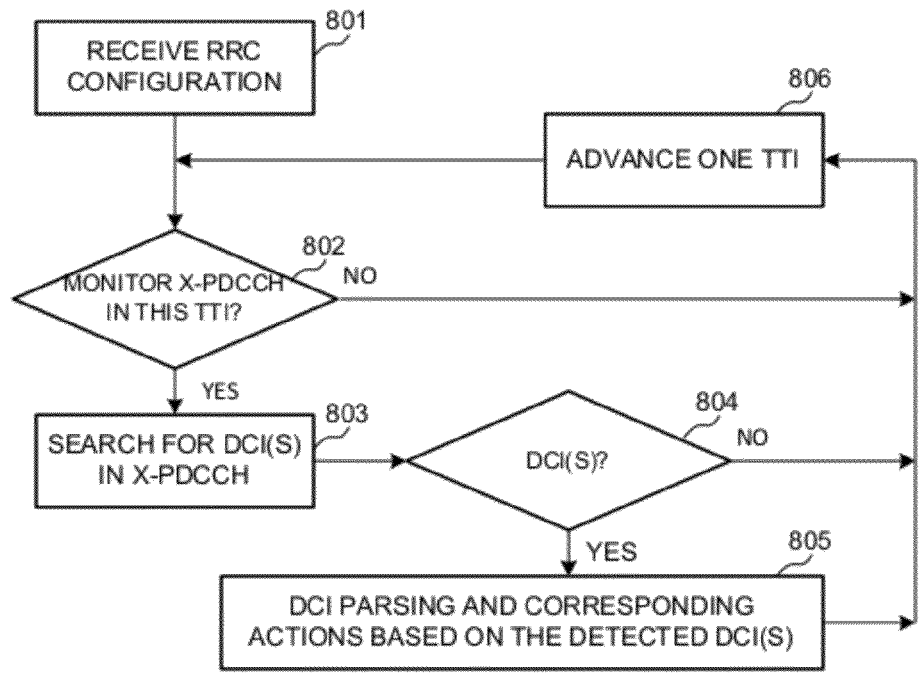
FIG. 8 is a flow chart of a second embodiment of a method of semi-static signaling for UE-specific downlink control channel.

FIG. 8 is a flow chart of the second embodiment of a method of semi-static signaling for UE-specific downlink control channel. In step 801, a UE receives higher-layer RRC signaling X that contains semi-static signaling information for UE-specific downlink control channel. In step 802, the UE monitors X-PDCCH in the current TTI/subframe based on a subframe bitmap. If the subframe bitmap indicates that the current TTI/subframe does not contain any X-PDCCH for UE(s) to monitor, then the UE advances one TTI in step 806 and goes back to step 802. On the other hand, if the subframe bitmap indicates that the current TTI/subframe contains X-PDCCH for UE(s) to monitor, then the UE searched for DCI(s) in X-PDCCH in step 803 based on the semi-static signaling information from the RRC signaling X. In step 804, the UE determines whether there is any DCI found in the current TTI. If no DCI is found, then the UE advances one TTI in step 806 and goes back to step 802. On the other hand, the UE parses the DCI(s) and performs corresponding actions based on the DCI(s) in step 805. Finally, the UE advances one TTI in step 806 and goes back to step 802. Note that the UE does not have to search for DCI(s) in PDCCH before searching in X-PDCCH.

Figure 9:
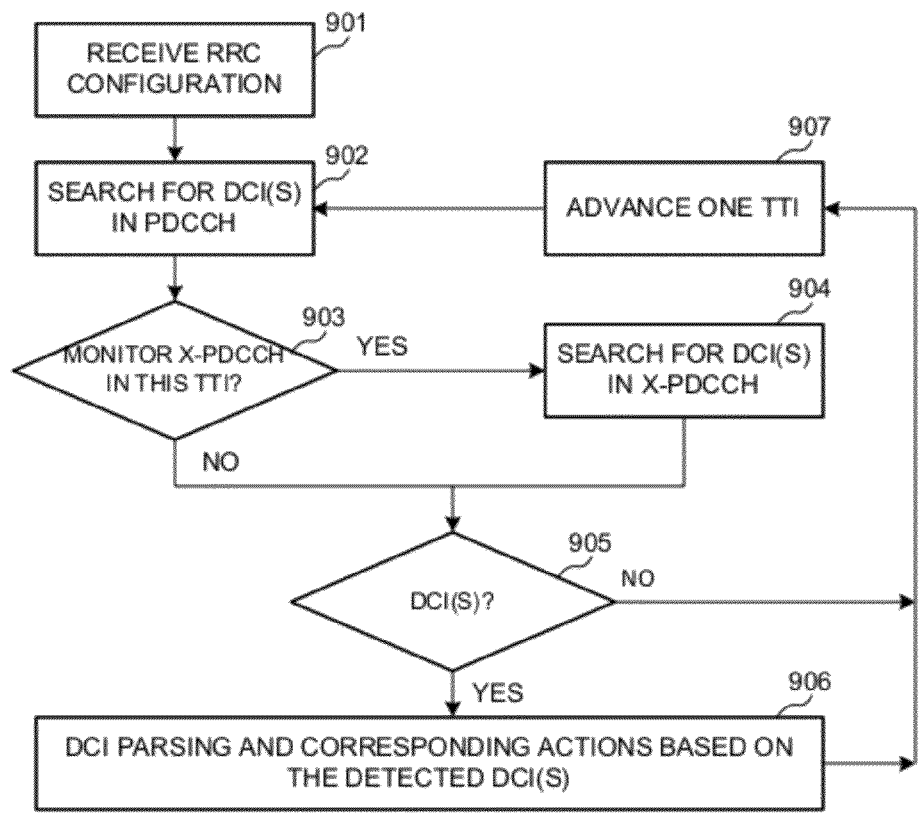
FIG. 9 is a flow chart of a third embodiment of a method of semi-static signaling for UE-specific downlink control channel.

FIG. 9 is a flow chart of a third embodiment of a method of semi-static signaling for UE-specific downlink control channel. The third embodiment is a combination of the first and the second embodiment of semi-static signaling for UE-specific downlink control channel. In step 901, a UE receives higher-layer RRC signaling X that contains semi-static signaling information for UE-specific downlink control channel. In step 902, the UE searches for DCI(s) in PDCCH. In step 903, the UE monitors X-PDCCH in the current TTI/subframe based on a subframe bitmap. If the subframe bitmap indicates that the current TTI/subframe does not contain any X-PDCCH for UE(s) to monitor, then the UE directly goes to step 905. On the other hand, if the subframe bitmap indicates that the current TTI/subframe contains X-PDCCH, then the UE searched for DCI(s) in X-PDCCH in step 904 based on the semi-static signaling information from the RRC signaling X.

In step 905, the UE determines whether there is any DCI found in the current TTI. If no DCI is found, then the UE advances one TTI in step 907 and goes back to step 902. On the other hand, the UE parses the DCI(s) and performs corresponding actions based on the DCI(s) in step 906. Finally, the UE advances one TTI in step 907 and goes back to step 902.

Figure 10:
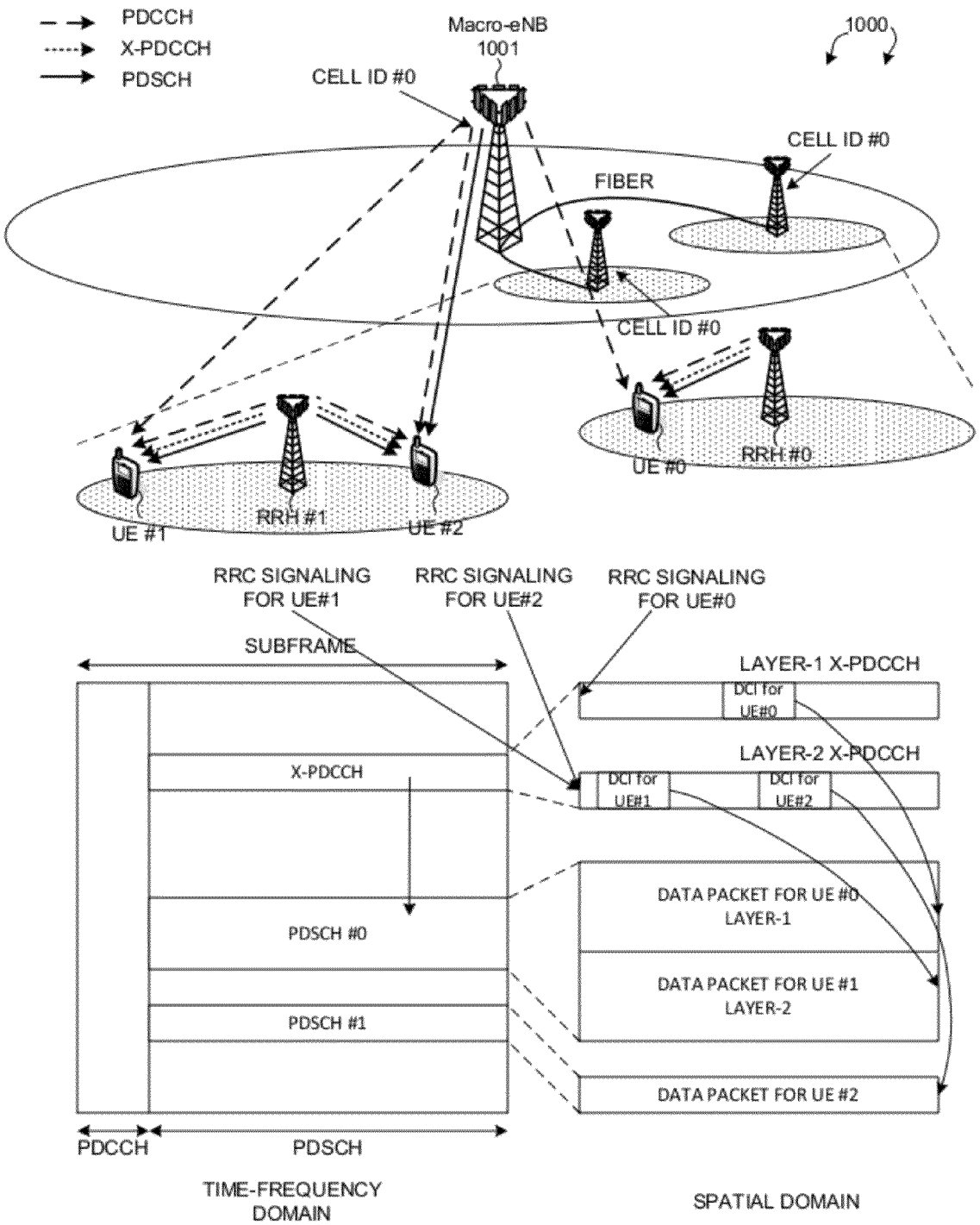
FIG. 10 illustrates one application in CoMP scenario 4 of applying semi-static signaling for UE-specific downlink control channel.

FIG. 10 illustrates one application in CoMP scenario 4 of applying semi-static signaling for UE-specific downlink control channel. Wireless network 1000 comprises a macro-eNB 1001, a first RRH#0 that serves UE#0, and a second RRH#1 that serves UE#1 and UE#2. All the UEs are configured to utilize UE-specific downlink control channel. Dedicated RRC signaling is used to provide semi-static signaling information for UE-specific downlink control channel. For example, RRC signaling X for UE#0 signals UE#0 to find layer-1 X-PDCCH. UE#0 then decodes the scheduler (DCI) inside layer-1 X-PDCCH, which contains assignment information for data packet that is located in layer-1 PDSCH#0. Similarly, UE#1 and UE#2 receive RRC signaling X such that UE#1 and UE#2 are able to find layer-2 X-PDCCH. UE#1 and UE#2 then decode the schedulers (DCIS) inside layer-2 X-PDCCH, which contain assignment information for data packets that are located in layer-2 PDSCH#0 and PDSCH#1 respectively.

Semi-static signaling for UE-specific downlink signaling channel provides significant control overhead reduction for PDCCH, as compared to TM9. Take channel bandwidth of 50 RBs as an example, and suppose there are N groups of UEs and each group has K UEs. Take the size of DCI format 2C (36 bits) as the size of the scheduler in X-PDCCH. The control overhead of the proposed method is (36*K), and the control overhead of DCI format 2C is (36*N*K). If N=2 and K=4, then the overhead reduction is 50%. The overhead reduction ratio increases with the number of UE groups and does not vary with the number of UEs in each group. In general, the overhead reduction is 1−(1/N), where N is the number of RRHs in a cell. Therefore, it is especially beneficial for CoMP scenario 4 because the overhead reduction ratio increases when there are more RRHs in a cell. While more RRC signaling overhead is introduced, there is no specification impact on DCI formats.

Figure 11:
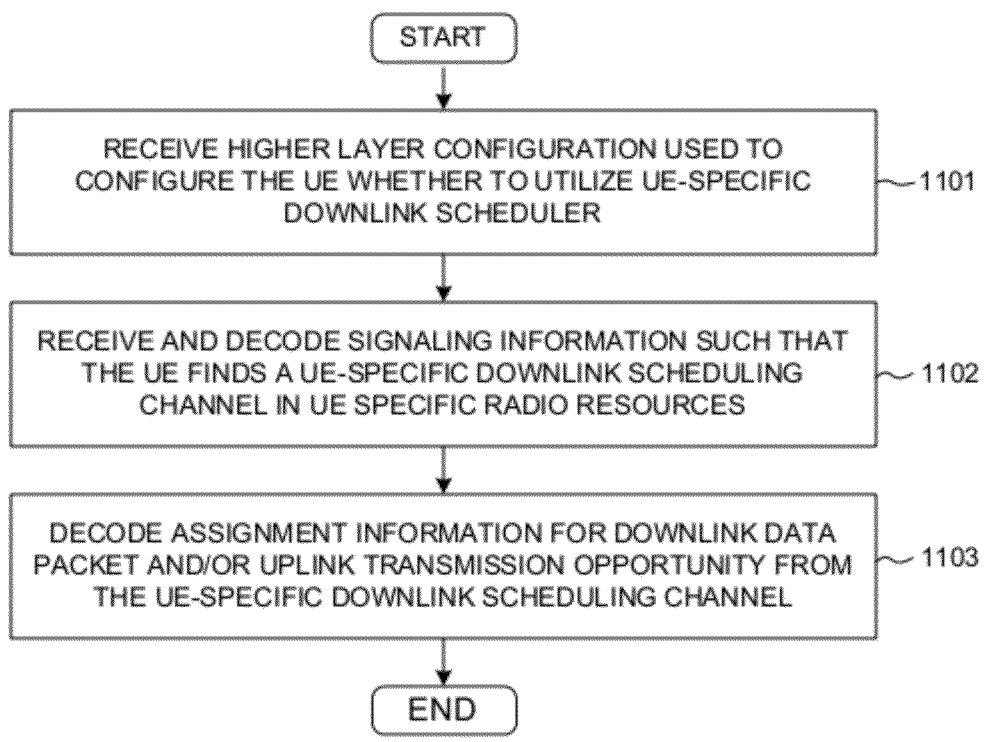
FIG. 11 is a flow chart of a method of signaling for UE-specific downlink control channel.

FIG. 11 is a flow chart of a method of signaling for UE-specific downlink control channel. In step 1101, a UE receives higher-layer configuration used to configure the UE whether to utilize UE-specific downlink control channel. In step 1102, the configured UE receives and decodes signaling information such that the UE finds a UE-specific downlink control channel in UE-specific radio resource. In one embodiment, the signaling is a dynamic signaling in cell-specific radio resource. In another embodiment, the signaling is a semi-static signaling via upper layers. In step 1103, the UE decodes assignment information for downlink data packet and/or uplink transmission opportunity from the UE-specific downlink control channel.

Although the present invention has been described in connection with certain specific embodiments for instructional purposes, the present invention is not limited thereto. For example, the usage of UE-specific downlink control channel are not limited to the scheduling for MU-MIMO or CoMP only, other MIMO schemes and deployment scenarios are also possible. Accordingly, various modifications, adaptations, and combinations of various features of the described embodiments can be practiced without departing from the scope of the invention as set forth in the claims.

What is claimed is:

1. A method, comprising:
receiving a physical-layer dynamic downlink signaling in cell-specific radio resources by a user equipment (UE), wherein the dynamic downlink signaling is used to signal the UE dynamic signaling information of a UE-specific downlink control channel in UE-specific radio resources that contain UE-specific downlink schedulers and/or uplink grants, wherein a specific downlink control information (DCI) format is used in the cell-specific radio resources for the dynamic signaling, and wherein a legacy downlink control channel in the cell-specific radio resources is a Physical Downlink Control Channel (PDCCH) for legacy scheduling using common pilots; and
decoding assignment information for downlink data packet and/or uplink transmission opportunity in the UE-specific downlink control channel.

2. The method of claim 1, wherein the UE-specific downlink control channel in the UE-specific radio resources is an enhanced PDCCH (ePDCCH) that resides in a legacy Physical Downlink Shared Channel (PDSCH) using dedicated pilots.

3. The method of claim 1, wherein the UE-specific downlink control channel is viewed as an extended space of the legacy downlink control channel, and wherein the UE searches for schedulers in the PDCCH first and then in the ePDCCH.

4. The method of claim 1, further comprising:
receiving a higher-layer configuration used to configure the UE whether to utilize the UE-specific downlink control channel.

5. The method of claim 1, further comprising:
receiving a higher-layer configuration for configuring a group ID for the UE, wherein the UE decodes from the UE-specific downlink schedulers that are associated with the same group ID.

6. The method of claim 1, wherein the dynamic signaling information comprises at least one of a group ID, a resource allocation type, a resource block assignment, and a MIMO rank and a single or multiple antenna ports for the decoding of the UE-specific downlink control channel.

7. The method of claim 1, wherein a specific signature is applied to encode the dynamic downlink signaling such that the UE is able to identify that the dynamic downlink signaling is used for the UE-specific downlink control channel.

8. A method, comprising:
receiving a higher-layer signaling by a user equipment (UE), wherein the higher-layer signaling is used to signal the UE semi-static signaling information of a UE-specific downlink control channel in UE-specific radio resources that contains UE-specific downlink schedulers and/or uplink grants;
searching for a legacy downlink control channel in cell-specific radio resources;
searching for the UE-specific downlink control channel in the UE-specific radio resources; and
decoding assignment information for downlink data packet and/or uplink transmission opportunity in the UE-specific downlink control channel.

9. The method of claim 8, wherein the higher-layer signaling is used to configure the UE whether to utilize the UE-specific downlink control channel.

10. The method of claim 8, wherein the semi-static signaling information comprises at least one of an enabler for the UE-specific downlink control channel, a resource allocation type, a resource block assignment, and a MIMO rank and a single or multiple antenna ports for the decoding of the UE-specific downlink control channel.

11. The method of claim 8, wherein the legacy downlink control channel in the cell-specific radio resources is a Physical Downlink Control Channel (PDCCH) using common pilots, and wherein the UE-specific downlink control channel in the UE-specific radio resources is an enhanced PDCCH (ePDCCH) using dedicated pilots.

12. The method of claim 8, wherein the higher-layer signaling is a Radio Resource Control (RRC) signaling.

13. A method, comprising:
receiving a higher-layer signaling by a user equipment (UE), wherein the higher-layer signaling is used to signal the UE semi-static signaling information of a UE-specific downlink control channel in UE-specific radio resources that contains UE-specific downlink schedulers and/or uplink grants;
searching for the UE-specific downlink control channel in the UE-specific radio resources in a specific subframe if the UE is signaled to monitor the UE-specific radio resources for the UE-specific downlink control channel in the specific subframe; and
decoding assignment information for downlink data packet and/or uplink transmission opportunity in the UE-specific downlink control channel.

14. The method of claim 13, wherein the higher-layer signaling is used to configure the UE whether to utilize the UE-specific downlink control channel.

15. The method of claim 13, wherein the semi-static signaling information comprises at least one of an enabler for the UE-specific downlink schedulers, a resource allocation type, a resource block assignment, a MIMO rank and a single or multiple antenna ports for the decoding of the UE-specific downlink control channel.

16. The method of claim 13, wherein a subframe bitmap is configured via the higher-layer signaling to indicate which subframes to be monitored by the UE searching for the UE-specific downlink control channel.

17. The method of claim 16, wherein the subframe bitmap is either cell-specific or UE-specific.

18. The method of claim 16, wherein the UE searches for the UE-specific downlink control channel in the UE-specific radio resources without searching for a legacy downlink control channel in cell-specific radio resources in the same subframe.

19. The method of claim 13, wherein a legacy downlink control channel in cell-specific radio resources is a Physical Downlink Control Channel (PDCCH) using common pilots, and wherein the UE-specific downlink control channel in the UE-specific radio resources is an enhanced PDCCH (ePDCCH) using dedicated pilots.

20. The method of claim 13, wherein the higher-layer signaling is a Radio Resource Control (RRC) signaling or an information element.

* * * * *